Sept. 15, 1931.  L. H. MESSINGER, JR  1,823,501
RUBBER CUTTING MACHINE
Filed Oct. 31, 1928  4 Sheets-Sheet 3

INVENTOR.
Lester H Messinger, Jr.
BY
Chamberlain & Newman
ATTORNEYS.

Sept. 15, 1931. L. H. MESSINGER, JR 1,823,501
RUBBER CUTTING MACHINE
Filed Oct. 31, 1928 4 Sheets-Sheet 4
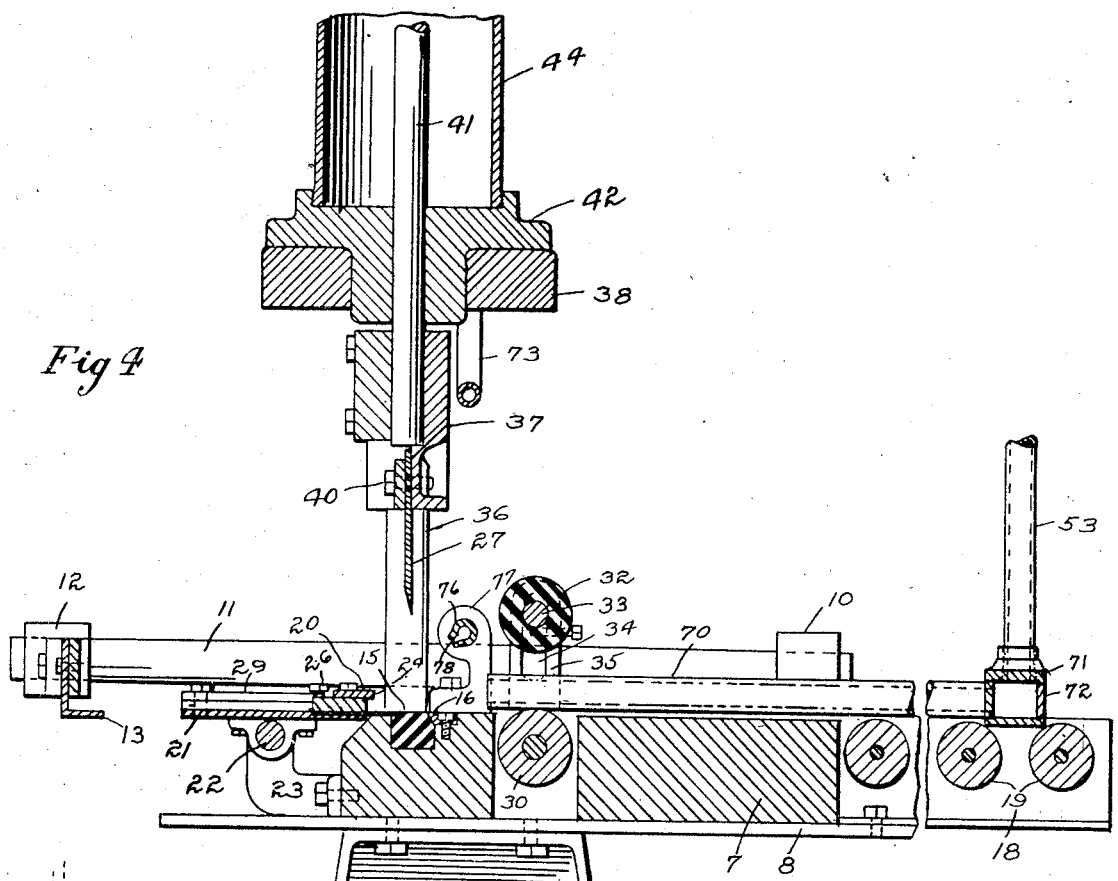
INVENTOR.
Lester H. Messinger, Jr.
BY
Chamberlain & Newman
ATTORNEYS.

Patented Sept. 15, 1931

1,823,501

UNITED STATES PATENT OFFICE

LESTER H. MESSINGER, JR., OF BRIDGEPORT, CONNECTICUT, ASSIGNOR TO THE BLACK ROCK MANUFACTURING COMPANY, OF BRIDGEPORT, CONNECTICUT, A CORPORATION OF CONNECTICUT

RUBBER-CUTTING MACHINE

Application filed October 31, 1928. Serial No. 316,288.

This invention relates to new and useful improvements in rubber-cutting machines of the class used for cutting bar stock rubber, of different sizes, into various lengths.

Heretofore it has been difficult to cut thin disc-like pieces from bar stock with a machine employing a reciprocatory cutting blade. Consequently the operations have been thus far accomplished by rotatable knives that are fed into the stock or the stock fed to the knives. This form of cutting is comparatively slow, and unsatisfactory in many other ways, especially where the bars of stock are particularly heavy.

The object of the invention is to provide an improved type of machine for the above purposes, which will cut stock of varying different thickness and quality into various lengths including relatively thin pieces and to do it quickly uniformly and in a way to insure the cutting of pieces of uniform thickness.

A further object of the invention is to provide a rubber-cutting machine which is adapted to accommodate and operate simultaneously upon a number of bars of rubber stock and to do it quickly and efficiently, to provide a machine wherein compressed air may be used as the operating medium for cutting the stock and likewise for automatically feeding the same to the cutter and removing the cut pieces from the machine.

As will be observed, the machine is semi-automatic, that is, it is automatic in its feeding and cutting operations when set and released by manual manipulation of a hand lever operated by an attendant.

With these and other objects in view, the invention resides and consists in the construction and novel combination and arrangement of parts hereinafter more fully described, illustrated in the accompanying drawings, and pointed out in the claims hereto appended it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings, forming a part of this specification and upon which Fig. 1 shows a perspective view of the front side of my improved rubber-cutting machine, the legs and runway for stock being broken away;

Fig. 3 shows a sectional plan view, taken on line 4—4 of Fig. 2, showing the bed or main frame of the machine together with the compressed air stock feeding means, heretofore referred to;

Fig. 4 shows a central vertical sectional view through the bed, guide pipes of feeding device, and reciprocatory knife; and Fig. 5 shows an enlarged sectional plan view of a section of piping, for compressed air feeding means, and length of stock therein.

Figure 1:
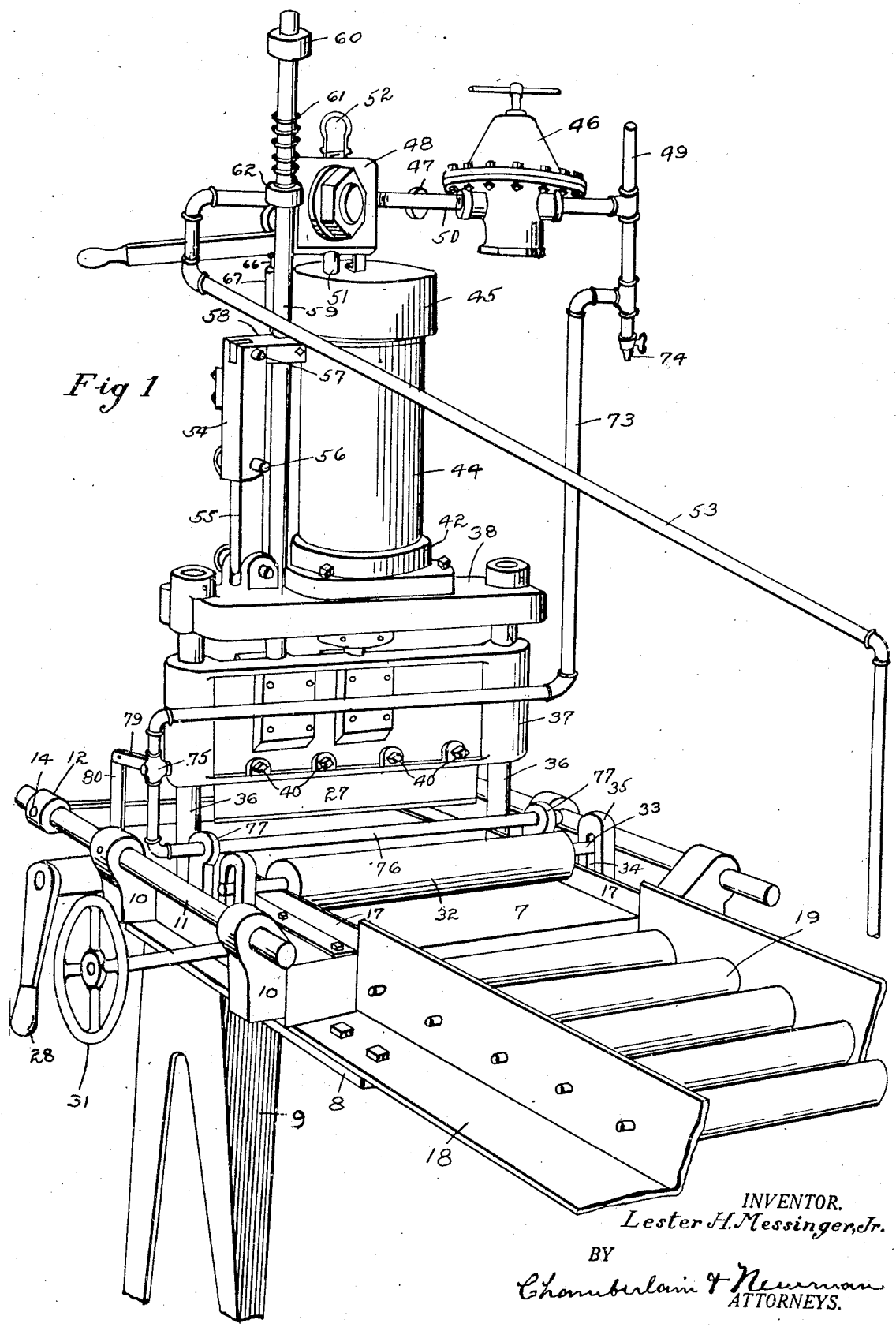

Referring in detail to the characters of reference marked upon the drawings, 7 represents the bed of the machine which is mounted on a frame 8 secured to legs 9. A pair of brackets 10 are attached to opposite sides of the bed, extending outward and upward, said arms being bored to receive and hold guide rods 11 upon each side of the machine. These guide rods in turn serve to carry an adjustable stop 12 upon their rear end portions. This stop is made up of several pieces extending from one rod to the other and is adjustably mounted thereon.

The stop includes an elongated angle iron 13 having a forwardly projected portion disposed in substantially a horizontal plane with the bed and line of movement of the stock to be cut, which passes over the surface of the bed and under the knife. This angle iron serves as a support for the projected ends of the stock as it is brought forward and while it is being cut off. Set screws 14 serve to secure the stop in its adjusted position on the rods 11 to determine the length of the pieces to be cut. This stop is more particularly used when cutting the bar stock into relatively long pieces.

The bed 7 is further provided with a transverse slot in which is placed a strip of rubber 15 immediately beneath the knife, and against which the cutting edge of the knife operates. This rubber is removably secured in place by means of a clamping plate 16, see Fig. 4.

A guide plate 17 is secured to the top surface of the opposite side portions of the bed to form sides of a runway for the stock. One end of side beams 18—18 is secured upon the frame 8 by means of screws and serve to support rolls 19, the top surface of which align with the surface of the bed, so that the bars of rubber stock may be readily shoved forward by hand in case the compressed air feeding device is not used. This runway may be of any desired length according to requirements and length of stock, it being shown broken in Figs. 1, 3 and 4 of the drawings.

Figure 3:
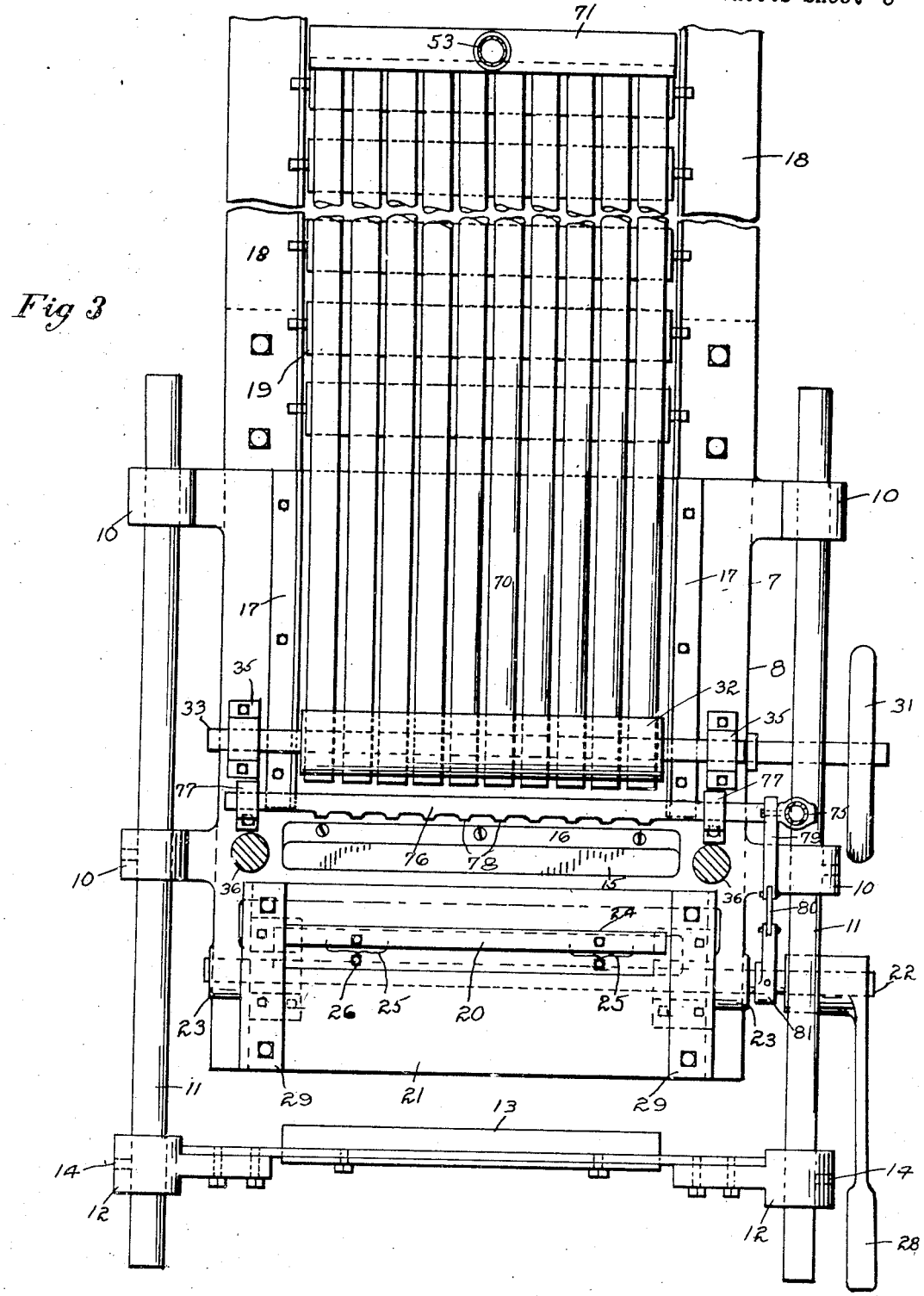

A second stop 20 is provided, for use in cutting short length pieces, in which case the previously described stop would not be used. This last mentioned stop 20 is mounted upon a hinged floor plate 21 that is secured to a rocker shaft 22 journalled in rearwardly extended brackets 23 of the bed, as shown in Fig. 3. The surface of the floor plate, when normally positioned, is approximately flush with the surface of the bed and adapted to allow the stock to be fed forward upon it until it abuts against the face 24 of the stop 20. In the rear of each end portion of this stop is provided a light spring 25 supported by a screw 26, which spring serves to yield slightly as the knife 27 passes down through the stock, so that the portion of the stock that is being cut off may be crowded forward slightly to compensate for the thickness of the blade and thus insure the cutting of a piece, of uniform thickness or length, that is a piece or length of rubber that is the same thickness throughout and not thicker through one portion than another. This floor plate is mounted for dumping by manual operations, see Fig. 4, by means of an operating handle 28. The plate may thus be tilted at an angle sufficient to allow the cut off pieces of rubber stock to be discharged from the plate into a receptacle not shown. Guides 29 are secured to the top surface of each side of the plate in order to prevent the cut pieces from moving off sidewise and to properly guide them when dumping the plate, so to speak.

The feed roll 30 for hand feeding is positioned in a recess of the bed and has its shaft journalled in the side portions thereof, one of said ends being extended out from the near side of the machine beyond the side rod and bracket and provided with a hand wheel 31 for its manipulation. The peripheral surface of this feed roll extends slightly above the top of the bed 7 in a way to grip and support the stock and draw it forward over the rolls of the runway. A second idler feed roll 32 is positioned immediately above the roll 30 and is mounted upon a shaft 33 that is rotatably and vertically movable in vertical slots 34 of brackets 35 secured to opposite side portions of the bed.

This top roll may be relatively heavy so as to bear the stock down upon the lower roll, which is the driver, so to speak. This hand feeding device is particularly adapted for the feeding of flat or sheet strip stock and would not be used when the automatic feed is used.

A pair of posts 36 are secured in the top of the side portions of the bed forming spaced apart guides, upon which the knife slide 37 reciprocates. A yoke 38 is secured to the upper end portion of these posts serving to tie the same together and form a support for the upper structure and mechanism mounted thereon. The reciprocatory slide 37 serves to carry the knife 27, which is adjustably secured to the slide by means of screws 40 passing through holes of the slide and vertical slots of the blade. This knife is relatively long extending across the operative surface of the bed so as to cut wide bars or a series of small ones. The knife slide is hung upon a piston rod 41 slidably mounted in the lower cylinder head 42, secured to the yoke 38 hereinbefore mentioned. Upon the upper end of the piston rod is mounted a piston 43, which, together with the rod, is mounted to reciprocate within the cylinder 44 secured within the above mentioned head 42 and provided with an upper head 45. This cylinder is connected at opposite ends by suitable compressed air pipes to insure the operation of the piston, rod and knife, by compressed air, through the reducing valve 46, gauge 47 and a four-way valve 48. 49 represents the supply pipe to the regulating valve, 50 the pipe connection from regulating valve, gauge and four-way valve, and 51 the pipe connection from four-way valve to the upper end of the cylinder, which obviously insures the downward or cutting stroke for the knife. 52 indicates the pipe from the four-way valve to the lower end of the cylinder, whereby the air pressure, when cut off from the upper end, is led into the lower end in a way to insure the return movement of the piston and knife. 53 represents an exhaust pipe that leads air from the four-way valve and which air in the present case is employed for automatic feeding.

The secret of the success of this machine resides in its ability to quickly cut the rubber, that is to quickly chop the pieces of rubber from the bar stock. This is obviously due first to the use of air pressure and second to the connections and means for applying this pressure to the head of the cylinder, when locked, and pending the feeding and adjustment of the stock in position, and third to the releasement of the locking means whereby the full force of pressure is applied to quickly actuate the knife, both in its downward cutting operation and its return movement to normal position. This action serves to shoot the knife downward through the rubber stock, the movement of which through connected means automatically operates the four-way valve in a way to turn off the air pressure from the top side of the piston and apply it to the under side, so as to return the same and the blade quickly. This operation is accomplished in part by the use of a toggle mechanism, clearly shown in Fig. 2, and a long operating lever also shown in the same figure. The toggle mechanism comprises two members 54 and 55 hingedly connected together by means of a pin 56, the former member 54 being also hingedly connected as at 57 to an arm 58 secured to a vertical reciprocatory rod 59, the latter end of which is secured in the slide 37 and whereby the rod is carried with it, being reciprocated through a hole in the yoke 38. A collar 60 is secured to the upper end of this rod and beneath this collar and loosely mounted upon the rod is a spring 61 that normally rests upon a collar 62 slidably mounted upon the rod and serving as a cushion for the limited downward movement of the knife.

63 represents the rockable stem of the four-way valve, upon which is mounted an arm 64 having a rounded free end portion that is movably positioned between the operating lever 65 and a slidable collar 62. This operating lever 65 is pivotally mounted upon the four-way valve and is adapted to be raised to the position shown in dotted lines Fig. 2, carrying with it the spring and collar and swinging the arm 64 on the valve stem in a way to turn the same and open the valve. The lever is lowered to its normal position and seated upon the head of a pin 66 slidably mounted in a bearing 67 formed upon the cylinder head 42. The end of this pin 66 is normally seated upon an arm 68 secured to the rear side of the toggle arm 54 and serves as a connection for breaking the toggle by a downward pull upon the lever 65 when it is desired to trip the mechanism to release the rod 59 and its slide and knife carried thereby. A spring 69 is mounted upon the pin 56 of the toggle and has its end portions connected to the two toggle members in a way to normally hold the toggle in its closed or locked position, as shown on Figs. 1 and 2, and the knife in raised position against movement.

Figure 2:
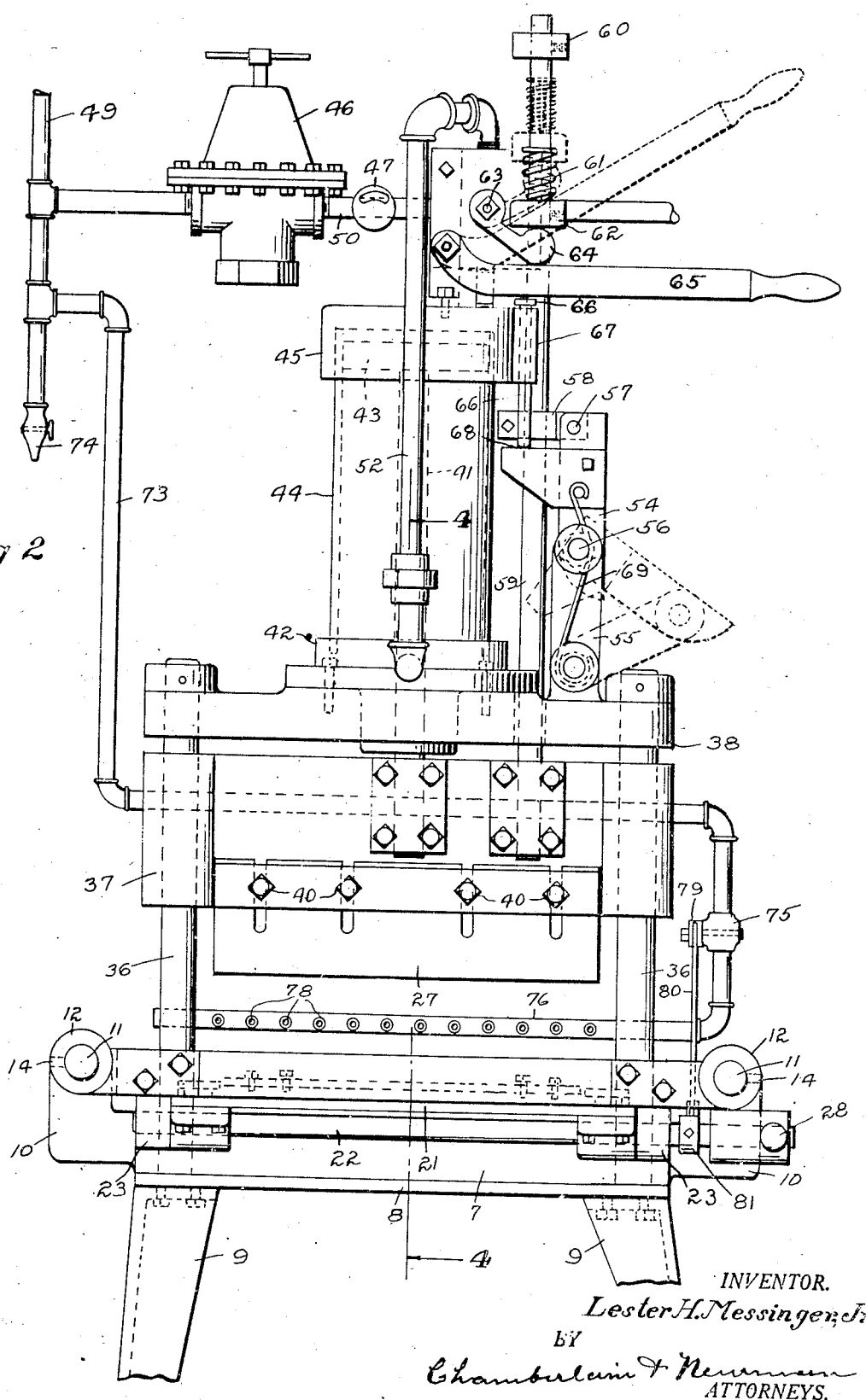
Fig. 2 shows a rear elevation of the machine as seen from the opposite side of Fig. 1.

In the operation of the machine it is first necessary to raise the hand lever 65, as indicated by dotted lines in Fig. 2, this serves to raise arm 64, collar 62 and its spring 61 and to set the arm 64, whereby the operating lever 65 may be lowered and seated upon the head of the pin 66 where it remains preparatory to its further operation for tripping the toggle. The raising of the operating lever, as just described, serves not alone to position the parts referred to but more particularly to change the four-way valve and turn the air against the top of the piston, which obviously does not act until the toggle is released.

The machine further includes a compressed air feeding device which may be used instead of the hand feed, if desired, and especially for the cutting of a series of small strips into relatively short pieces. This is accomplished, see Figs. 3, 4 and 5, by providing a series of hollow tubes 70 through which the stock A is fed to the cutting knife. The outer ends of the tubes are threaded and thus connected in tapped holes in the hollow cross-head 71 having a slide 72 in its outer face, adapted for removal to admit the lengths of stock to be cut, whereupon the slide is closed. This cross-head serves as an air conduit for conveying the air from the inlet or exhaust pipe 53 to the several tubes 70. I find in practice that this exhaust is of sufficient volume and force to insure the proper feeding of the rubber strips forward as required. The forward open ends of the tubes are positioned adjacent to the knife so that the strips of stock are fed forward upon the bed beneath the knife and against the stop. Any number of these guide tubes may be employed in the series according to the size of the stock to be cut and as shown are associated and secured together, forming a removable unit which rests upon the rolls 19 of the guideway and obviously would be used only for automatic feed and would be removed for the hand feeding of large bars of rubber stock.

I have also provided automatic compressed air means for blowing the cut pieces of stock off from the cutting block 15 and from under the knife so as to clear the machine for the stock to be fed. This means is accomplished by a pipe connection 73 with the main supply pipe 49, having a drain valve 74, and in which is located a shutoff valve 75, this shut-off valve is connected with a horizontal spray pipe 76 mounted in brackets 77 secured to the bed. This spray pipe is provided with a series of aligned small holes or nozzles 78 which serve to direct the air blasts against the several cut pieces in a way to blow them from the bed. This air pressure is employed for an instant only and immediately after the cutting operation, as the knife raises. The air supply is controlled by the valve 75, which is connected and operated through an arm 79, a link 80 and an arm 81 secured upon the rocker shaft 22, that is to say the air pressure is turned on automatically with the operation of the handle 28 when the rocker plate is tilted.

Having thus described my invention, what I claim and desire to secure by Letters Patent is:

1. In a rubber cutting machine, the combination with a bed, guides mounted thereon, a reciprocatory slide and knife mounted upon the guides, a compressed air cylinder, a piston and piston rod mounted in the cylinder and connected with and supporting the knife slide, a compressed air supply for the piston and knife, a control valve in the compressed-air supply line, and automatic operating connections with said valve for alternately turning air pressure into opposite ends of the cylinder, means for feeding strips of rubber stock beneath the knife, and means whereby the feeding is performed by compressed-air from the exhaust of the valve.

2. In a rubber cutting machine, the combination with a bed, guides mounted thereon, a reciprocatory slide and knife mounted upon the guides, a compressed air cylinder, a piston mounted in the cylinder and connected with and supporting the knife slide, a compressed air supply for the cylinder for operating the piston and knife, and compressed air means for automatically feeding strips of rubber stock beneath the knife.

3. In a rubber cutting machine, the combination with a bed, guides mounted thereon, a reciprocatory slide and knife mounted upon the guides, a compressed air cylinder, a piston mounted in the cylinder and connected with and supporting the knife slide, a compressed air supply for the cylinder for operating the piston and knife, compressed air means for automatically feeding strips of rubber stock beneath the knife, and stop means for limiting the movement of said strips of rubber stock to determine the length of pieces to be cut.

4. In a rubber cutting machine, the combination with a bed, guides mounted thereon, a reciprocatory slide and knife mounted upon the guides, a compressed air cylinder, a piston and piston rod mounted in the cylinder and connected with and supporting the knife slide, a compressed air supply for the cylinder for operating the piston and knife, compressed air means for automatically feeding strips of rubber stock beneath the knife, and yieldable stop means for limiting the movement of said strips of rubber stock.

5. In a rubber cutting machine, the combination with a bed, guides mounted thereon, a reciprocatory slide and knife mounted upon the guides, a compressed air cylinder, a piston and piston rod mounted in the cylinder and connected with and supporting the knife slide. a compressed air supply for the cylinder for operating the piston and knife, compressed air means for automatically feeding strips of rubber stock beneath the knife, and compressed air means for blowing the cut pieces from the bed of the machine.

6. In a rubber cutting machine, the combination with a bed, guides mounted thereon, a reciprocatory slide and knife mounted upon the guides to operate with respect to the bed, a compressed air cylinder, a piston and piston rod mounted in the cylinder and connected with and supporting the knife slide, compressed air pipe connections with the cylinder for operating the piston and knife, valve means within the pipe connections for controlling the air supply to the cylinder for operating the piston and knife and means for holding the piston and knife in a raised position against the air pressure.

7. In a rubber cutting machine, the combination with a bed, guides mounted thereon, a reciprocatory slide and knife mounted upon the guides to operate with respect to the bed, a compressed air cylinder, a piston and piston rod mounted in the cylinder and connected with and supporting the knife slide, compressed air pipe connections with the cylinder for operating the piston and knife, valve means within the pipe connections for controlling the air supply to the cylinder for operating the piston and knife, means for holding the piston and knife in a raised position against the air pressure and means for releasing said holding means to permit the air pressure to operate the piston and knife.

8. In a rubber cutting machine, the combination with a bed, guides mounted thereon, a reciprocatory slide and knife mounted upon the guides to operate with respect to the bed, a compressed air cylinder, a piston and piston rod mounted in the cylinder and connected with and supporting the knife slide, compressed air pipe connections with the cylinder for operating the piston and knife, valve means within the pipe connections for controlling the air supply to the cylinder for operating the piston and knife, means for holding the piston and knife in a raised position against the air pressure, means for releasing said holding means to permit the air pressure to operate the piston and knife, means for releasing said holding means to permit the air pressure to operate the piston and knife to cut the stock, and means for automatically reversing said air pressure to return the knife to normal position.

9. In a rubber cutting machine, the combination with a bed, guides mounted thereon, a reciprocatory slide and knife mounted upon the guides to operate with respect to the bed, compressed air means for operating the slide and knife, a toggle device for normally holding the slide and knife in a raised, locked position against the air pressure, and a hand lever and connections intermediate thereof and the toggle for manually tripping the latter for quick releasement and operation of the knife.

10. In a rubber cutting machine, the combination with a bed, guides mounted thereon, a reciprocatory slide and knife mounted upon the guides, a compressed air cylinder, a piston and piston rod mounted in the cylinder and supporting the knife slide, a compressed air supply for the cylinder for operating the piston and knife, locking means for holding the piston and knife in readiness for action, means to release said locking means to permit the knife to cut the stock, automatic compressed air means to return the knife, and exhaust means to blow the cut stock from the machine.

11. In a rubber cutting machine, the combination with a bed, guides mounted on the bed, a reciprocatory slide and knife mounted upon the guides, a compressed air cylinder, a piston mounted in the cylinder and connected with and supporting the knife slide, a compressed air supply for the cylinder for operating the piston and knife, compressed air means for automatically feeding strips of rubber stock beneath the knife, and said means comprising a series of tubes each adapted to receive a length of rubber stock, and means to introduce compressed air into the tubes to feed the stock therethrough.

Signed at Bridgeport, in the county of Fairfield and State of Connecticut this 30th day of Oct., A. D. 1928.

LESTER H. MESSINGER, Jr.